US008813937B2

(12) United States Patent
Hemphill (10) Patent No.: US 8,813,937 B2
(45) Date of Patent: Aug. 26, 2014

(54) CLUTCH PACK TRAVEL COMPENSATOR FOR REDUCED DRAG

(75) Inventor: Jeffrey Hemphill, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 230 days.

(21) Appl. No.: 13/420,976

(22) Filed: Mar. 15, 2012

(65) Prior Publication Data

US 2012/0234646 A1 Sep. 20, 2012

Related U.S. Application Data

(60) Provisional application No. 61/453,752, filed on Mar. 17, 2011.

(51) Int. Cl.
  *F16D 25/0638* (2006.01)
  *F16D 25/12* (2006.01)
  *F16D 13/75* (2006.01)

(52) U.S. Cl.
  USPC ............... 192/85.62; 192/70.252; 192/111.18

(58) Field of Classification Search
  USPC ................. 192/85.26, 85.62, 111.12, 111.14, 192/111.18
  See application file for complete search history.

(56) References Cited

U.S. PATENT DOCUMENTS

| 3,331,476 | A | | 7/1967 | Livezey |
| 3,756,361 | A | | 9/1973 | Persson et al. |
| 3,815,716 | A | * | 6/1974 | Harrington ............... 192/70.252 |
| 4,664,242 | A | * | 5/1987 | Downs ......................... 192/106 F |
| 5,749,451 | A | * | 5/1998 | Grochowski ............. 192/70.252 |
| 6,264,009 | B1 | * | 7/2001 | Johnson ........................ 188/72.6 |
| 7,455,161 | B2 | | 11/2008 | Choi |
| 2004/0154894 | A1 | | 8/2004 | Braford et al. |

FOREIGN PATENT DOCUMENTS

| JP | 3194215 A | 8/1991 |
| JP | 11294483 A | 10/1999 |

* cited by examiner

*Primary Examiner* — Richard M. Lorence
(74) *Attorney, Agent, or Firm* — Simpson & Simpson, PLLC (57) ABSTRACT

A clutch control assembly for a transmission, including a piston plate including a first side having a first circumferentially aligned and axially extending ramp, and a second side. The assembly includes an adjustment ring in contact with the first ramp, and at least one rotary piston with a first end fixed to the adjustment ring. In response to a first force applied to the second radially disposed side and the at least one rotary piston, the at least one rotary piston is displaceable to urge the adjustment ring in a first circumferential direction along the first ramp such that the adjustment rings displaces in a first axial direction away from the piston plate.

15 Claims, 9 Drawing Sheets

CLUTCH PACK TRAVEL COMPENSATOR FOR REDUCED DRAG

CROSS-REFERENCE TO RELATED APPLICATIONS

This application claims the benefit under 35 U.S.C. §119 (e) of U.S. Provisional Application No. 61/453,752 filed Mar. 17, 2011, which application is incorporated herein by reference.

TECHNICAL FIELD

The present disclosure relates to a clutch control assembly for a clutch pack in a transmission. In particular, the present disclosure relates to a clutch control assembly for reducing drag in the clutch pack while optimizing response time for clamping the clutch pack.

BACKGROUND

Figure 12:
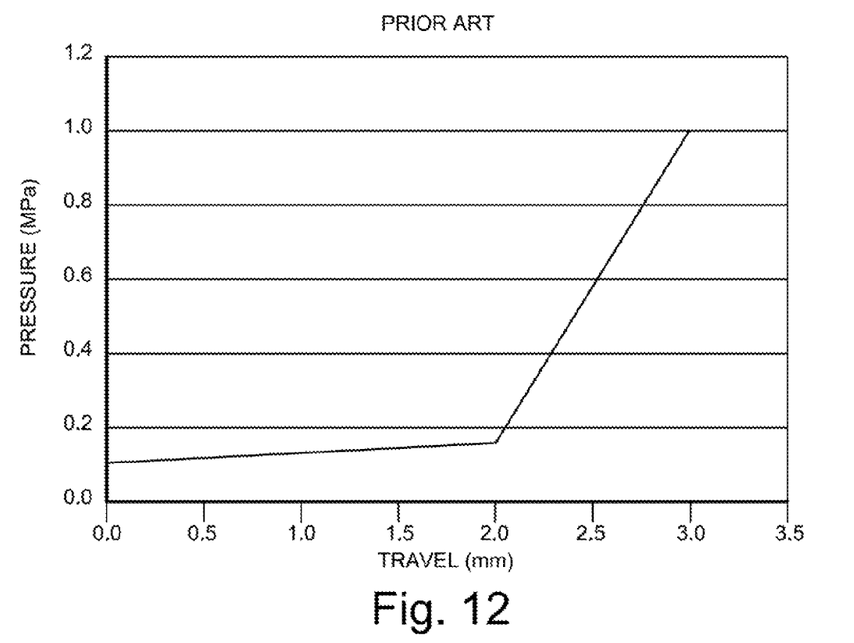

FIG. 12 is a prior art pressure versus travel diagram for a clutch piston plate in a transmission. For a typical known wet clutch used as a shifting clutch in a transmission a piston is displaced to close the clutch by pressurized oil behind the piston. Elements of a clutch pack for the clutch must be held apart when the clutch is not applied in order to minimize drag and improve fuel economy. This can be accomplished with a return spring. A typical lift-off gap is 2 mm which results in about 0.2 mm of lift-off per friction surface. In order to close the clutch, force is applied to the piston to move the piston into contact with the clutch pack and the force is increased to clamp the clutch pack. As shown in FIG. 12, in this example, a piston plate for the clutch travels 2.0 mm before contacting the clutch pack.

There is a conflict in wet clutch pack design between drag torque and shift time. That is, as the lift-off gap is increased, drag torque drops but shift time goes up. This is because the piston must be moved through the larger lift-off gap. This movement requires a larger amount of oil and a subsequent increase in time to supply the oil. In fact, ⅔ of the oil needed to apply the clutch is used simply to close the lift-off gap. Therefore, known wet clutches are designed with more drag than desired in order to minimize shift time. Furthermore, the point at which the piston contacts the clutch pack can be difficult to determine. The point varies as friction material in the clutch pack sets or wears and varies as a function of time since the piston was last applied. This uncertainty necessitates the added complexity of control algorithms to avoid rough shifts. Because the lift-off gap is so critical, tolerance adjusting methods are used when producing friction packs. These methods can include measuring the assembled pack and installing a select fit washer, or sorting plates and combining those that will give a nominal stack. Both methods add to production cost.

SUMMARY

According to aspects illustrated herein, there is provided a clutch control assembly for a transmission, including a piston plate including a first side having a first ramp, and a second side. The assembly includes an adjustment ring in contact with the first ramp, and at least one rotary piston with a first end fixed to the adjustment ring. In response to a first force applied to the second radially disposed side and the at least one rotary piston, the at least one rotary piston is displaceable to urge the adjustment ring in a first circumferential direction along the first ramp such that the adjustment rings displaces in a first axial direction away from the piston plate.

According to aspects illustrated herein, there is provided a clutch control assembly for a transmission, including: a piston plate; and an adjustment ring in contact with the piston plate. In response to a first force on the piston plate, the adjustment ring is displaceable in a first axial direction to contact a clutch pack for the transmission while the piston plate remains in a fixed axial position. In response to a second force, greater than the first fluid force, on the piston plate, the piston plate is displaceable in the first axial direction such that the adjustment ring clamps the clutch pack.

According to aspects illustrated herein, there is provided a clutch control assembly for a transmission, including a piston plate with a first side having a plurality of circumferentially aligned and axially extending ramps, and a second side. The assembly includes an adjustment ring in contact with the plurality of ramps; a plurality of rotary pistons passing through respective openings in the piston plate and with respective first ends fixed to the adjustment ring; and a plurality of springs disposed about respective outer circumferences of the plurality of rotary pistons and engaged with the second side of the piston plate and the plurality of rotary pistons. The plurality of springs urges the adjustment plate in a first circumferential direction along the plurality of ramps such that the adjustment plate displaces in a first axial direction. In response to a first force applied to the second side and the plurality of rotary pistons, the plurality of rotary pistons is displaceable to urge the adjustment ring in a second circumferential direction, opposite the first circumferential direction, along the plurality of ramps such that the adjustment rings displaces in a second axial direction, opposite the first axial direction, to contact a clutch pack for the transmission. In response to a second fluid force, greater than the first fluid force, applied to the second side, the piston plate is displaceable in the second axial direction such that the adjustment ring clamps the clutch pack for the transmission.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
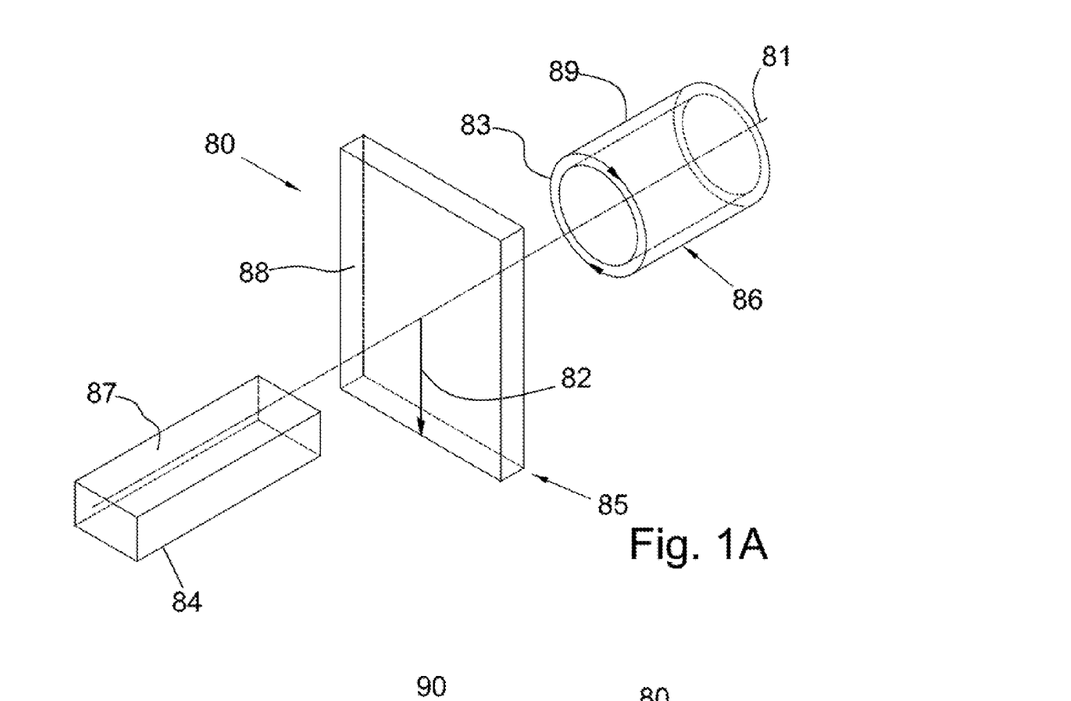
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
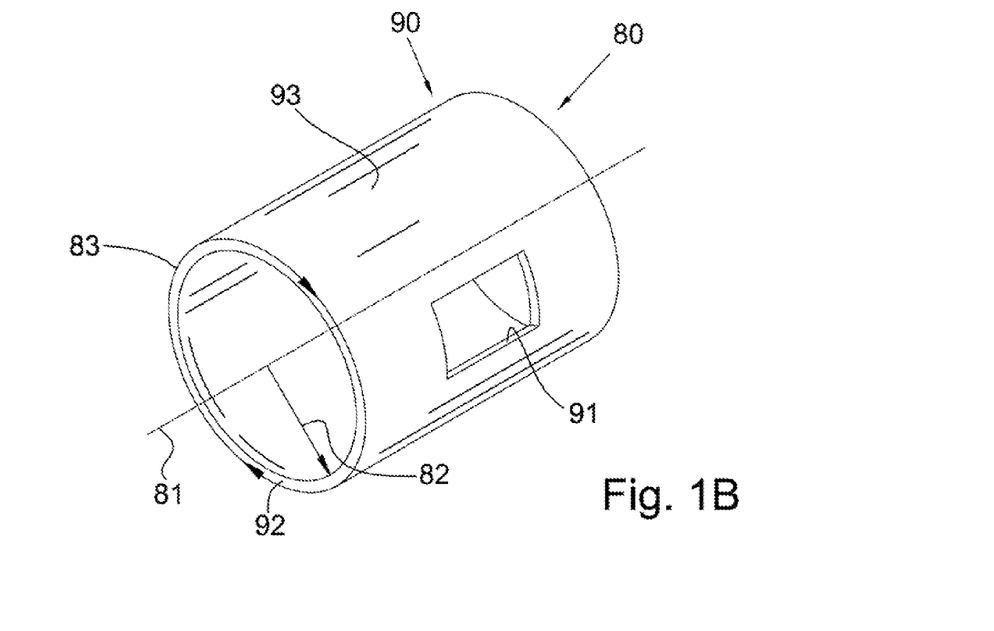
FIG. 1B is a perspective view of an object in the cylindrical coordinate system of FIG. 1A demonstrating spatial terminology used in the present application; and, FIG. 2 is a front perspective exploded view of a clutch control assembly for a transmission.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
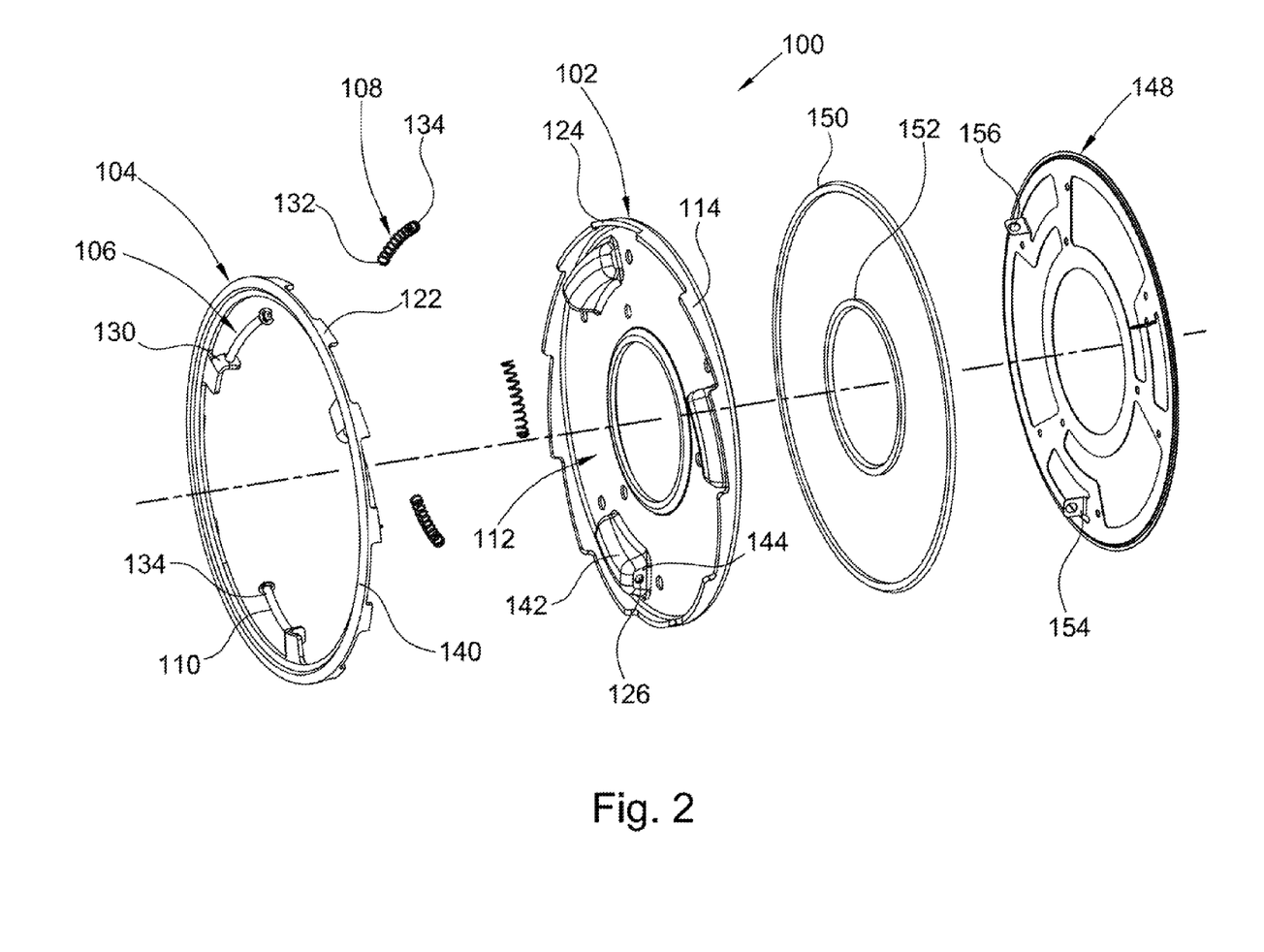

FIG. 2 is a front perspective exploded view of clutch control assembly 100 for a transmission.

Figure 3:
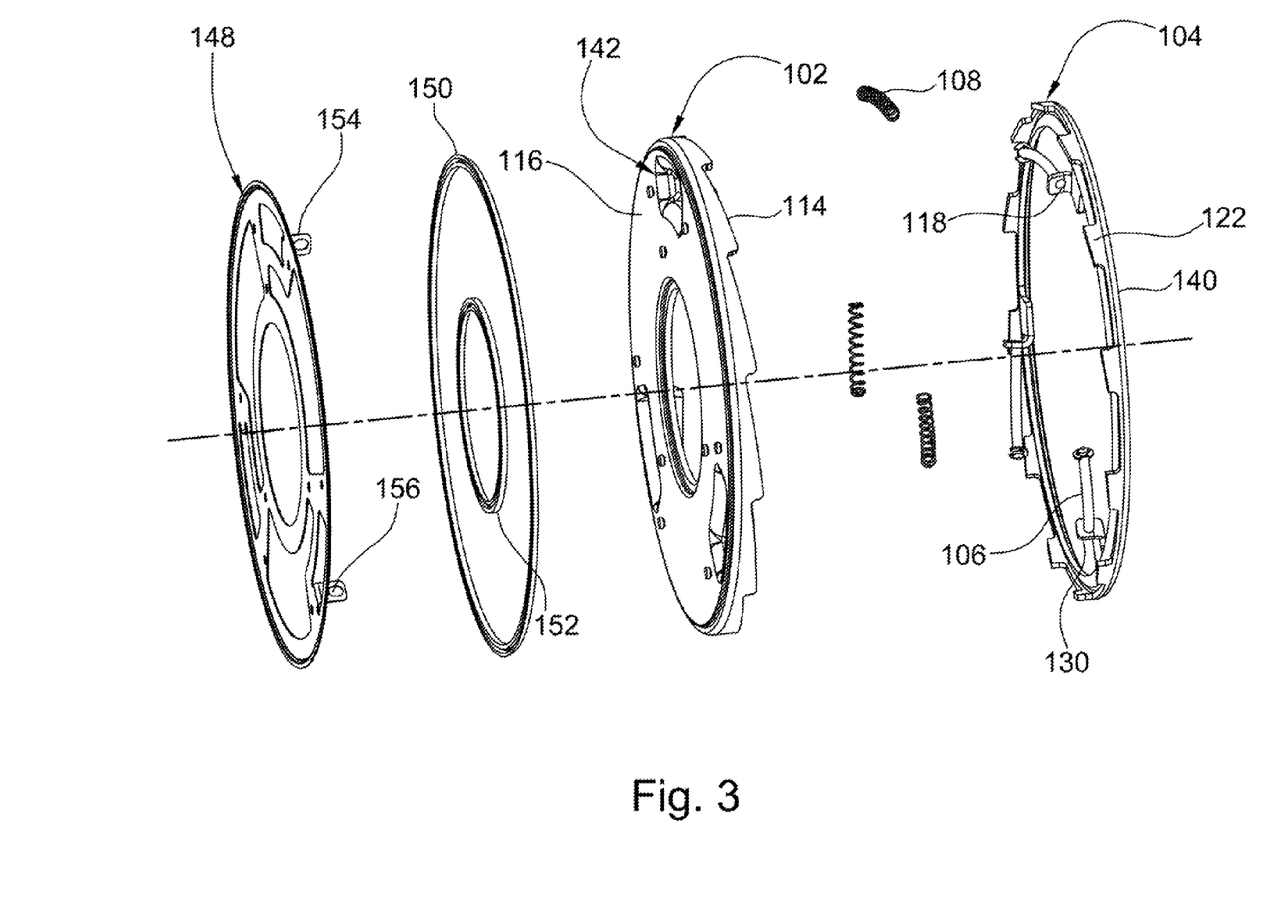
FIG. 3 is a back perspective exploded view of the clutch control assembly shown in FIG. 2.

FIG. 3 is a back perspective exploded view of clutch control assembly 100 shown in FIG. 2. The following should be viewed in light of FIGS. 2 and 3. Clutch control assembly 100 includes piston plate 102, adjusting ring 104, a plurality of pistons 106, and a plurality of springs 108 disposed about pistons 106. For example, each spring is disposed about outer circumference 110 for a respective piston. In an example embodiment, the pistons are made of plastic, or steel or aluminum wire. The piston plate includes radially disposed side 112 having a plurality of circumferentially aligned, or disposed, and axially extending ramps 114, and radially disposed side 116. Pistons 106 include respective ends 118 fixed to the adjustment ring. In an example embodiment, the adjustment ring includes a plurality of circumferentially aligned, or disposed, and axially extending ramps 122 in contact with ramps 114, for example, surfaces 124 of ramps 114.

Figure 4:
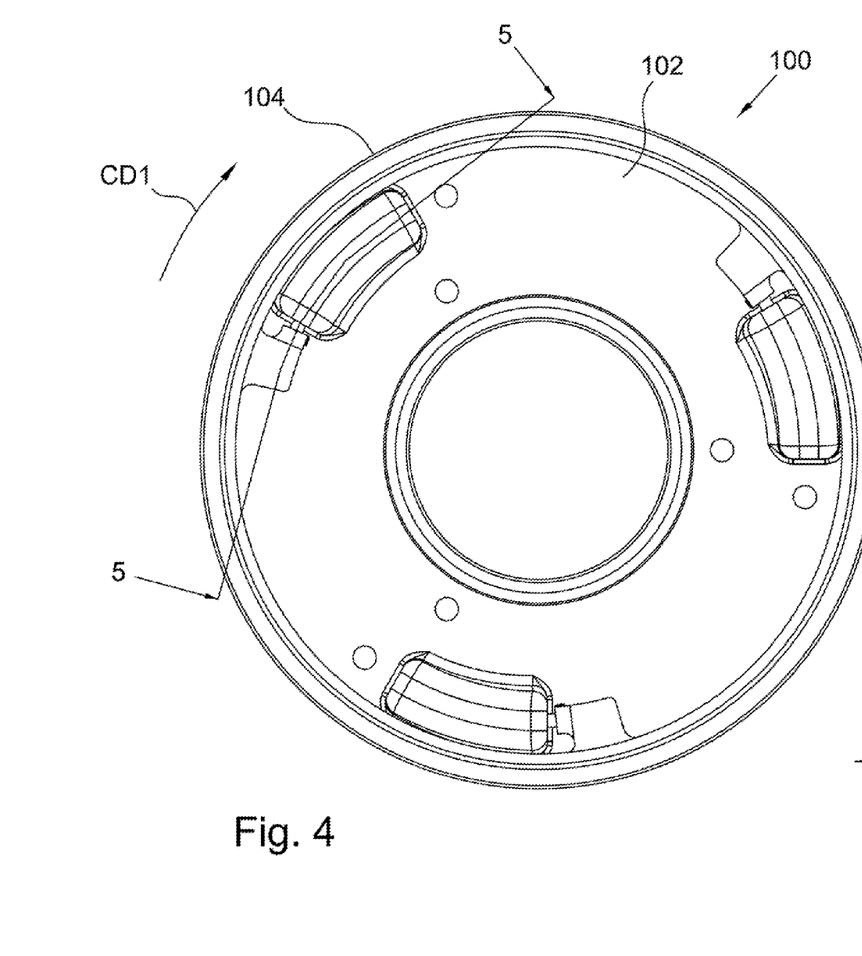
FIG. 4 is a front view of the clutch control assembly shown in FIG. 2 with an adjustment ring in a refracted position.

FIG. 4 is a front view of clutch control assembly 100 shown in FIG. 2 with the adjustment ring in a retracted position.

Figure 5:
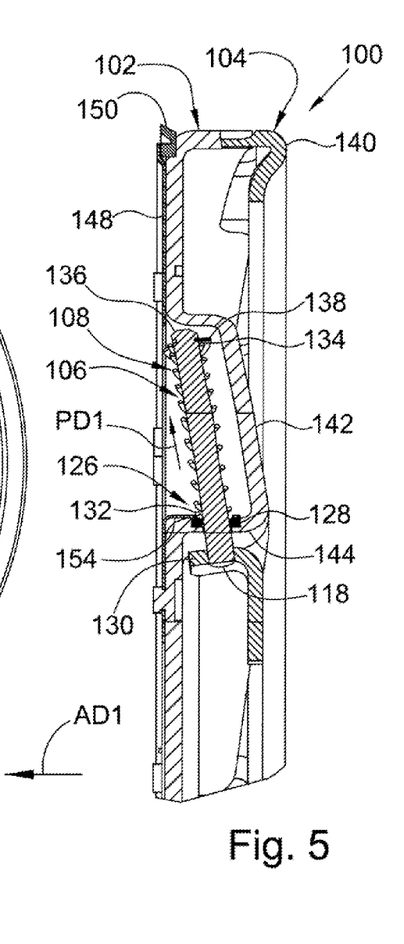
FIG. 5 is a cross-sectional view of the clutch control assembly shown in FIG. 2, generally along line 5-5 in FIG. 4.

FIG. 5 is a cross-sectional view of clutch control assembly 100 shown in FIG. 2, generally along line 5-5 in FIG. 4. The following should be viewed in light of FIGS. 2-5. In an example embodiment, the rotary pistons pass through openings 126 in the piston plate and are sealed with respect to the piston plate by seals 128. Ends 118 of the pistons are fixedly secured to the adjustment ring, for example, to axial protrusions 130. Springs 108 include ends 132 in contact with the piston plate and opposite ends 134. Pistons 106 include ends 136 opposite ends 118. Ends 134 are at least indirectly engaged with ends 136. In an example embodiment, the pistons include protrusions 138 proximate ends 136 and ends 134 are engaged with the protrusions. In an example embodiment, the protrusions are clips attached to the pistons.

The plurality of springs urge the rotary pistons in direction PD1, drawing ends 118 closer to openings 126. This movement urges the adjustment plate in circumferential direction CD1, which causes ramps 122 to advance down and along ramps 114, such that the adjustment plate displaces in axial direction AD1, for example, toward the piston plate. Thus, outer portion 140 of the adjustment ring is drawn closer to the piston plate. This is the retracted position shown in FIGS. 4 and 5.

Figure 6:
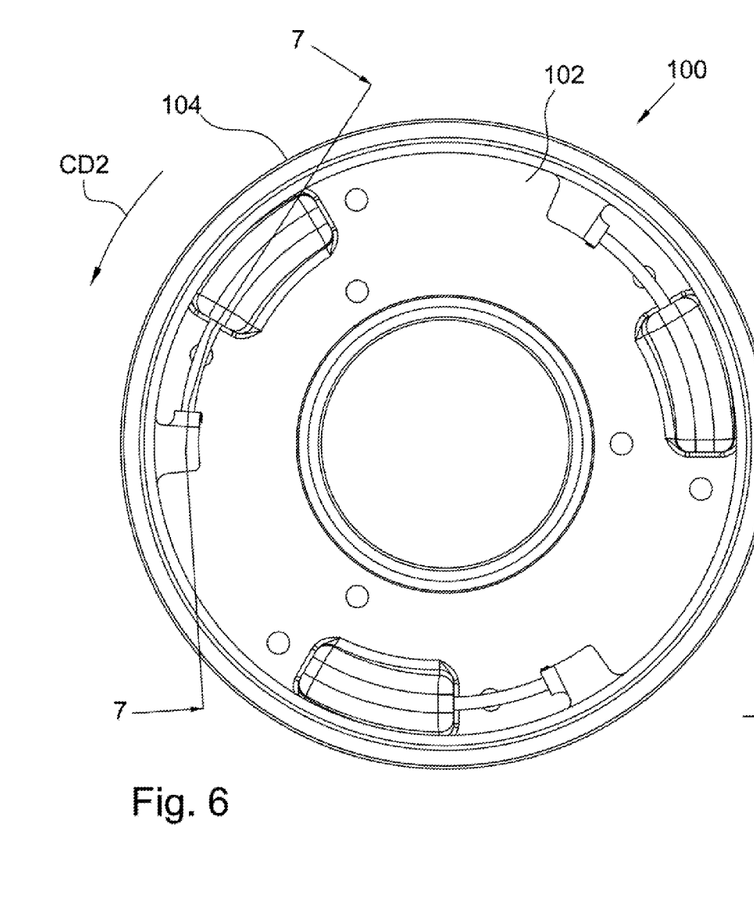
FIG. 6 is a front view of the clutch control assembly shown in FIG. 2 with an adjustment ring in an extended position.

FIG. 6 is a front view of clutch control assembly 100 shown in FIG. 2 with the adjustment ring in an extended position.

Figure 7:
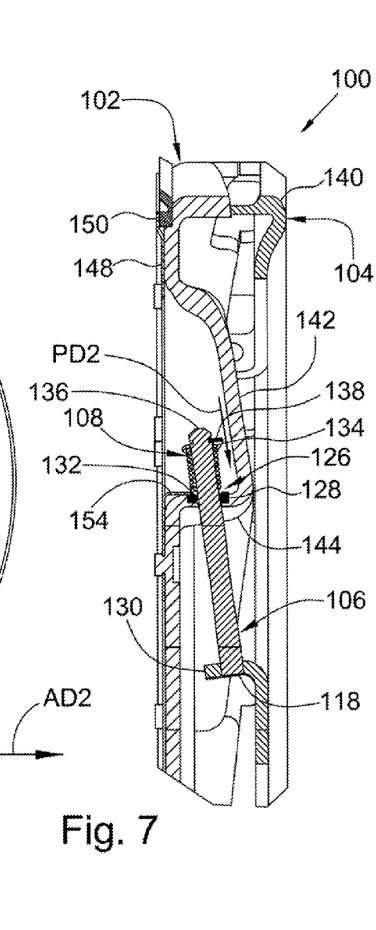
FIG. 7 is a cross-sectional view of the clutch control assembly shown in FIG. 2, generally along line 7-7 in FIG. 6.

FIG. 7 is a cross-sectional view of clutch control assembly 100 shown in FIG. 2, generally along line 7-7 in FIG. 6. The following should be viewed in light of FIGS. 2-7. To operate assembly 100, fluid, and subsequent force from the fluid, is applied to side 116 of the piston plate and to the portion of the rotary pistons disposed on side 116 of the piston plate, for example, ends 134. For force below a first level, the rotary pistons are displaced in direction PD2, opposite PD1, pushing ends 136 closer to openings 126. This movement urges the adjustment plate in circumferential direction CD2, opposite direction CD1, which causes ramps 122 to advance up and along ramps 114, such that the adjustment plate displaces in an axial direction AD2, opposite direction AD1. Thus, outer portion 140 of the adjustment ring is pushed away from the piston plate. This is the extended position shown in FIGS. 6 and 7. The piston plate remains in a fixed axial position. As further described infra, in the extended position, the adjustment ring can be brought into contact with a clutch pack for a transmission.

When the fluid force on side 116 of the piston plate is increased beyond the first level, the piston plate displaces in direction AD2, for example, to clamp the clutch pack in contact with the adjustment ring.

In an example embodiment, the piston plate includes belled sections 142 including openings 126. Sections 142 provide portions 144 that provide support and orientation for ends 132 of the springs. In an example embodiment, the assembly includes clip ring 148 and seals 150 and 152. Ring 148 retains seal 150 with respect to the piston plate to seal the outer circumference of the piston plate, for example with respect to a housing as shown infra. Ring 148 retains seal 152 with respect to the piston plate to seal the inner circumference of the piston plate as shown infra. Axial protrusions 154 retain seals 128 and include openings 156 through which the pistons pass.

Figure 8:
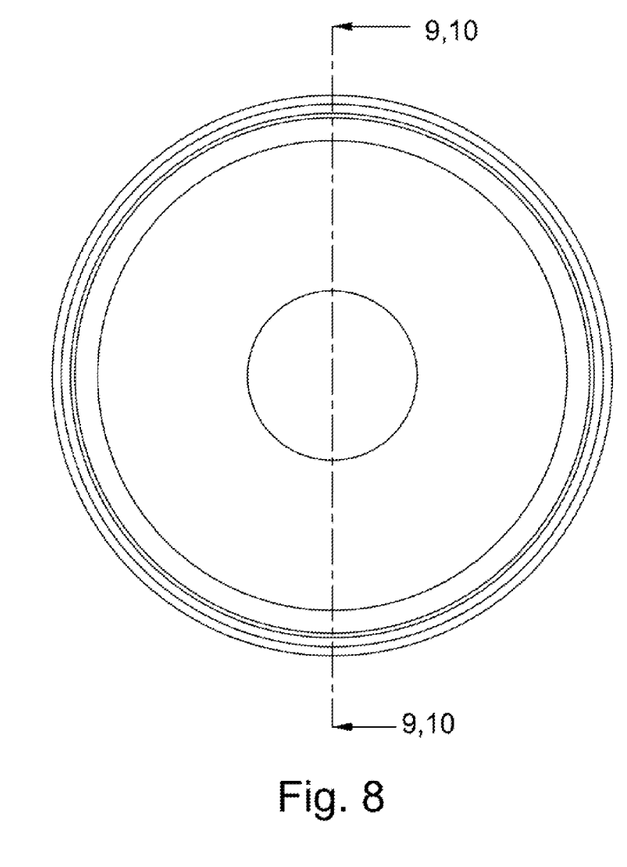
FIG. 8 is a rear view of the clutch control assembly shown in FIG. 2 in a transmission housing.

FIG. 8 is a rear view of clutch control assembly 100 shown in FIG. 2 in transmission housing 158.

Figure 9:
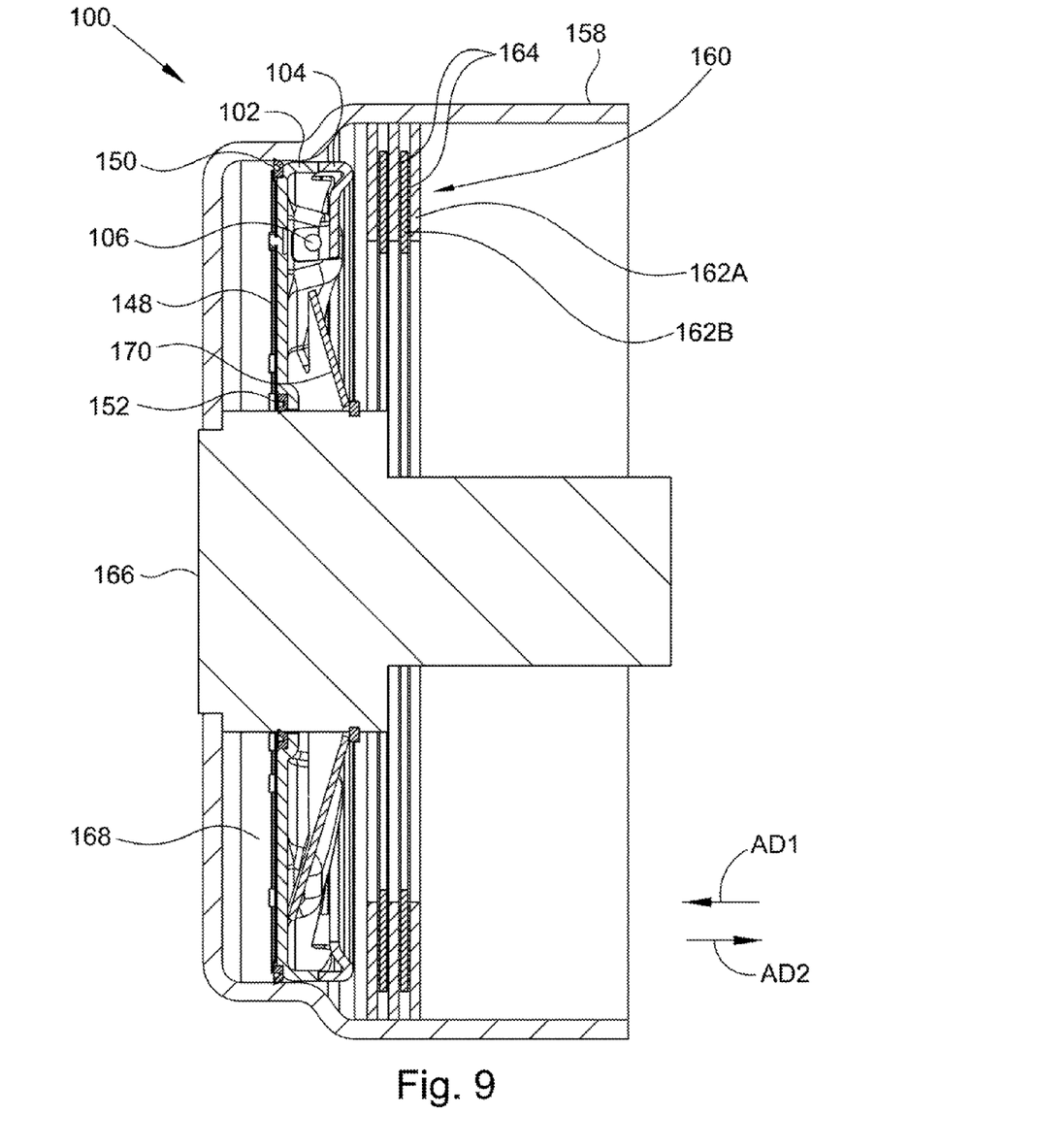
FIG. 9 is a cross-sectional view of the clutch control assembly and transmission housing shown in FIG. 8, generally along line 9,10-9,10 in FIG. 8, showing the adjustment ring in the retracted position, and a clutch pack for the transmission.

FIG. 9 is a cross-sectional view of clutch control assembly 100 and transmission housing 158 shown in FIG. 8, generally along line 9,10-9,10 in FIG. 8, showing the adjustment ring in the retracted position, and clutch pack 160 for the transmission.

Figure 10:
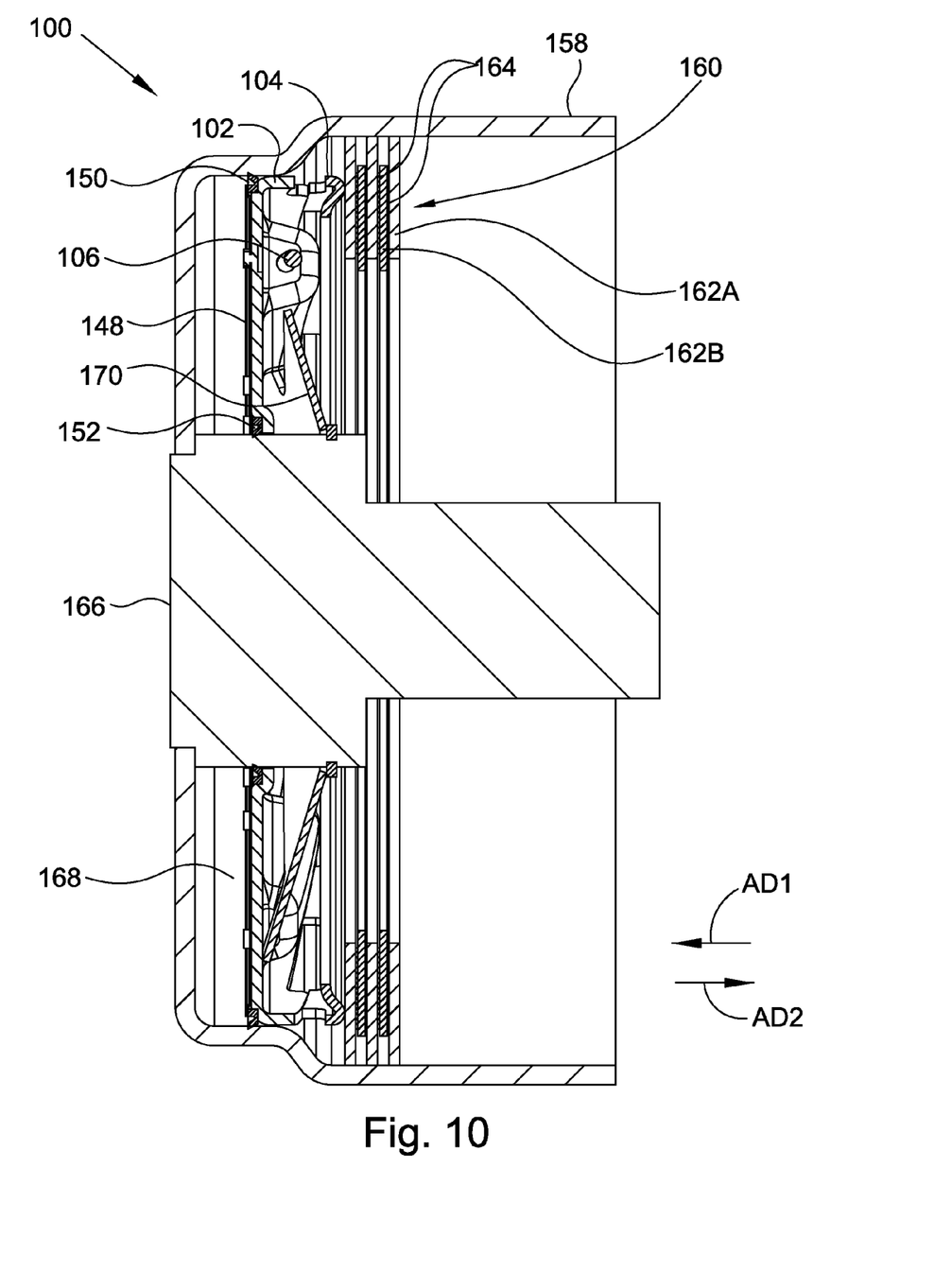
FIG. 10 is a cross-sectional view of the clutch control assembly and transmission housing shown in FIG. 8, generally along line 9,10-9,10 in FIG. 8, showing the adjustment ring in the extended position, and a clutch pack for the transmission.

FIG. 10 is a cross-sectional view of clutch control assembly 100 and transmission housing 158 shown in FIG. 8, generally along line 9,10-9,10 in FIG. 8, showing the adjustment ring in the extended position, and clutch pack 160 for the transmission. The following should be viewed in light of FIGS. 2 through 10. By clutch pack we mean a combination of clutch plates, for example clutch plates 162, and friction material, for example, friction material 164. Typically, the clutch plates are connected in alternating fashion to two independently rotatable elements. For example, plate 162A is connected to one of housing 158 or an inner clutch carrier (not shown) and plate 162B is connected to the other of the housing or inner carrier. In an example embodiment, housing 158 is a transmission housing and clutch pack 160 is for a transmission brake. In an example embodiment, housing 158 is an outer clutch housing and clutch pack 160 is for a transmission clutch. Clamping the clutch pack enables torque to be transmitted between the two independently rotatable elements through the clutch plates, for example, between housing 158 and the inner carrier, or to stop rotation of a rotating element through the clutch plates, for example, to connect the rotating inner carrier with the stationary transmission housing. As noted supra, to operate assembly 100, a pressure force is applied to side 116 of the piston plate and to the portion of the rotary pistons disposed on side 116 of the piston plate, for example, ends 134. In FIGS. 8 through 10, this force is supplied by fluid in chamber 168.

The position of assembly 100 in FIG. 9 is analogous to the position of assembly 100 in FIG. 5. For example, the adjustment ring is in the retracted position and is not in contact with clutch pack 160. Seal 150 seals the piston plate against housing 158 and seal 152 seals the piston plate against shaft 166.

The position of assembly 100 in FIG. 10 is analogous to the position of assembly 100 in FIG. 7. For example, the adjustment ring is in the extended position and is in contact with clutch pack 160. In one embodiment, assembly 100 includes retaining element 170, for example a spring, which exerts force on the piston plate in direction AD1. As noted supra, for force on side 116 of piston plate 102 below a first level, the rotary pistons displace while the piston plate remains fixed. In FIGS. 8 through 10, element 170 provides a force about equal to the first level to counteract the force from chamber 168 and to hold the piston plate in place. Stated otherwise, element 170 is preloaded with a force about equal to the first level. When the adjustment ring contacts the clutch pack, equilibrium is reached between the force on the rotary pistons and the adjustment ring and the compression force for the clutch pack. When the fluid pressure in chamber 168 is increased such that the force on the piston plate increases beyond the first level noted above, that is, the force from the fluid in chamber 168 is greater than the preloading force from element 170, the piston displaces in direction AD2 to clamp the clutch plates.

Figure 11:
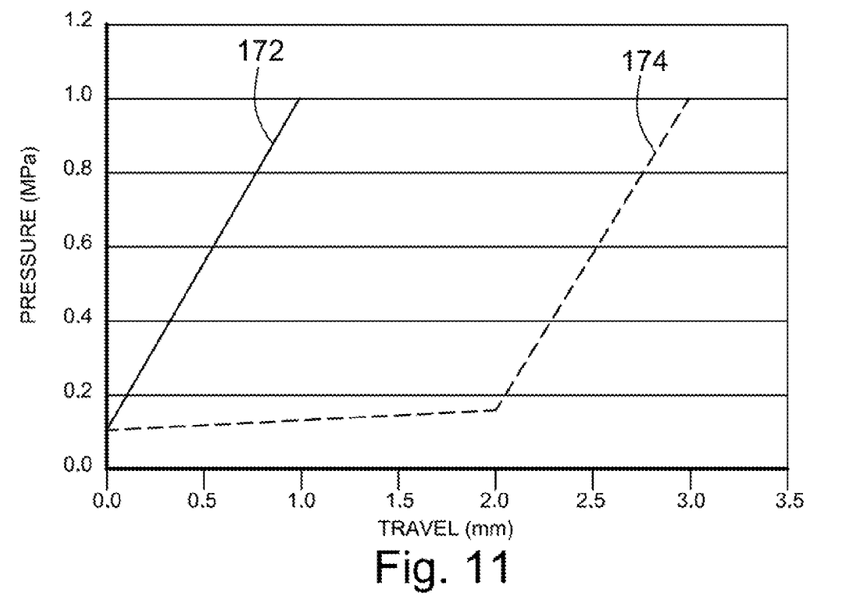
FIG. 11 is a pressure versus travel diagram for the piston plate in the clutch shown in FIGS. 9 and 10; and, FIG. 12 is a prior art pressure versus travel diagram for a clutch piston plate in a transmission.

FIG. 11 is a pressure versus travel diagram for piston plate 102 in the clutch shown in FIGS. 9 and 10. As noted supra, at the beginning of line 172, the adjustment ring has already been advanced to contact the clutch pack, As pressure in chamber 168 is increased, the piston plate overcomes the preload on element 170 and begins to clamp the clutch pack, Line 172 represents the travel, or axial displacement, of piston plate 102 to clamp clutch pack 160. Line 174 shows the axial displacement of a prior art piston plate for a transmission, for example, as shown in FIG. 12. The prior art piston plate must advance 2.0 mm to contact the clutch pack at which point the prior art piston plate can further advance to clamp a clutch pack. Advantageously, as seen in FIG. 11, the travel for clutch plate 102 is much less than the travel for the prior art clutch plate (1.0 mm versus 3.0 mm in this example).

Assembly 100 provides at least the following advantages:
1. The total oil required to clamp a clutch pack can be greatly reduced, since the travel of the piston plate is so greatly reduced. For example, in FIG. 11, the amount of oil is reduced by more than 50%.
2. The total work done on the piston plate to clamp the clutch pack is reduced by 25%. This is because the piston plate, with its greater surface area, is not used to close the relatively large lift-off gap. Instead, pistons 106, with dramatically smaller surface areas, and the adjustment ring are used to fill the gap between the assembly and the clutch pack. This enables a smaller transmission pump to be used, which further improves fuel economy.
3. Shift time is reduced since the rotary pistons can be advanced in less time than the main piston because less fluid pressure is needed to advance the pistons. Also, the shift time is reduced since no control algorithm, such as a touch point "feeling" routine, is needed.
4. Lift-off gap can be increased due to the reduction in shift time. An increase in lift-off gap typically increases shift time, but this increase in shift time due to the gap is compensated by the shift time reduction noted above. An increase in lift-off gap results in lower drag torque (for example, from a typical 3 Nm to 1 Nm) and better fuel economy.
5. No tolerance correcting measures are needed for the clutch pack since the gap filling mechanism fill to a predefined load regardless of gap. That is, pistons 106 automatically displace as needed such that the adjustment ring contacts the clutch pack. This reduces fabrication cost and complexity.

Although clutch control assembly 100 has been shown with a particular configuration of components, it should be understood that clutch control assembly 100 is not limited to the particular configuration of components shown and that other configurations of components are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A clutch control assembly for a transmission, comprising:
   a piston plate including:
      a first side having a first circumferentially aligned and axially extending ramp; and,
      a second side;
   an adjustment ring in contact with the first ramp; and,
   a rotary piston with a first end engaged with the adjustment ring, wherein in response to a first force applied to the second side and to the rotary piston, the rotary piston is displaceable to urge the adjustment ring in a first circumferential direction along the first ramp such that the adjustment ring displaces in a first axial direction away from the piston plate.

2. The clutch control assembly of claim 1 wherein the adjustment ring includes a second circumferentially disposed and axially extending ramp in contact with the first circumferentially aligned and axially extending ramp.

3. The clutch control assembly of claim 1 wherein the adjustment ring is displaceable to contact a clutch pack for the transmission.

4. The clutch control assembly of claim 1 wherein:
   the piston plate is in an axial position; and,
   in response to the first force the piston plate remains in the axial position.

5. The clutch control assembly of claim 1 wherein in response to second force, greater than the first force, applied to the second side, the piston plate is displaceable in the first axial direction such that the adjustment ring clamps a clutch pack for the transmission.

6. The clutch control assembly of claim 1 wherein the rotary piston passes through an opening in the piston plate.

7. The clutch control assembly of claim 1 further comprising a spring, wherein:
   the rotary piston passes through an opening in the piston plate;
   the spring is disposed about an outer circumference of the rotary piston; and,
   the spring urges the adjustment plate in a second circumferential direction, opposite the first circumferential direction, such that the adjustment plate displaces in a second axial direction, opposite the first axial direction.

8. The clutch control assembly of claim 7 wherein:
   the rotary piston includes a second end with a protrusion;
   the spring includes a first end engaged with the second side of the piston plate; and,
   the spring includes a second end, opposite the first end, engaged with the protrusion.

9. A clutch control assembly for a transmission, comprising:
   a piston plate; and,
   an adjustment ring in contact with the piston plate, wherein:
      in response to a first force on the piston plate, the adjustment ring is displaceable in a circumferential direction and a first axial direction to contact a clutch pack for the transmission while the piston plate remains in a fixed axial position; and,
      in response to a second force, greater than the first force, on the piston plate, the piston plate is displaceable in the first axial direction such that the adjustment ring clamps the clutch pack.

10. The clutch control assembly of claim 9 further comprising a plurality of rotary pistons with respective first ends fixed to the adjustment ring, wherein:
    the piston plate includes:
       a first radially disposed side having a first plurality of circumferentially aligned and axially extending ramps; and,
       a second side;
    the adjustment ring is in contact with the first plurality of ramps; and,
    in response to the first force, the plurality of rotary pistons is displaceable to urge the adjustment ring in a circumferential direction along the first plurality of ramps such that the adjustment ring displaces in the first axial direction.

11. The clutch control assembly of claim 10 wherein the adjustment ring includes a second plurality of circumferentially aligned and axially extending ramps in contact with the first plurality of circumferentially aligned and axially extending ramps.

12. The clutch control assembly of claim 10 wherein the plurality of rotary pistons passes through respective openings in the piston plate.

13. The clutch control assembly of claim 9 further comprising:
    a plurality of rotary pistons with respective first ends fixed to the adjustment ring; and,
    a plurality of springs, wherein:
       the plurality of rotary pistons passes through respective openings in the piston plate;
       each spring from the plurality of springs is disposed about an outer circumference of a respective rotary piston from the plurality of rotary pistons; and,
       the plurality of springs urges the adjustment plate in a circumferential direction such that the adjustment plate displaces in a second axial direction, opposite the first axial direction.

14. The clutch control assembly of claim 13 wherein:
    the plurality of rotary pistons includes respective second ends with respective protrusions; and,
    the plurality of springs includes:
       respective first ends engaged with a second radially disposed side of the piston plate; and,
       respective second ends, opposite the respective first end, engaged with the respective protrusions.

15. A clutch control assembly for a transmission, comprising:
    a piston plate including:
       a first side having a plurality of circumferentially aligned and axially extending ramps; and,
       a second side;
    an adjustment ring in contact with the plurality of ramps;
    a plurality of rotary pistons passing through respective openings in the piston plate and with respective first ends fixed to the adjustment ring; and,
    a plurality of springs disposed about respective outer circumferences of the plurality of rotary pistons and engaged with the second side of the piston plate and the plurality of rotary pistons, wherein:
       the plurality of springs urges the adjustment plate in a first circumferential direction along the plurality of ramps such that the adjustment plate displaces in a first axial direction toward the piston plate;
       in response to a first force applied to the second side and the plurality of rotary pistons, the plurality of rotary pistons is displaceable to urge the adjustment ring in a second circumferential direction, opposite the first circumferential direction, along the plurality of ramps such that the adjustment ring displaces in a second axial direction, opposite the first axial direction, to contact a clutch pack for the transmission; and, in response to a second fluid force, greater than the first fluid force, applied to the second radially disposed side, the piston plate is displaceable in the second axial direction such that the adjustment ring clamps the clutch pack for the transmission.

\* \* \* \* \*